United States Patent
Ridenour et al.

(10) Patent No.: US 6,928,868 B2
(45) Date of Patent: Aug. 16, 2005

(54) WATER WELL MONITORING SYSTEM

(75) Inventors: Keith Ridenour, Plainfield, IN (US); Jack Gardner, Fredericksburg, TX (US)

(73) Assignee: Endress & Hauser Wetzer GmbH & Co. KG, Nesselwang (DE)

( * ) Notice: Subject to any disclaimer, the term of this patent is extended or adjusted under 35 U.S.C. 154(b) by 0 days.

(21) Appl. No.: 10/121,764

(22) Filed: Apr. 11, 2002

(65) Prior Publication Data

US 2003/0192379 A1 Oct. 16, 2003

(51) Int. Cl.$^7$ .............................................. G01F 23/00
(52) U.S. Cl. ...................................... 73/299; 73/290 R
(58) Field of Search ............................... 73/299, 290 R, 73/290 V, 152.15, 152.01, 301, 308, 313; 340/853.2; 324/333, 668; 367/27

(56) References Cited

U.S. PATENT DOCUMENTS

| | | | |
|---|---|---|---|
| 3,711,689 A | * | 1/1973 | Park .............................. 702/46 |
| 3,909,948 A | | 10/1975 | Markfelt |
| 3,975,115 A | | 8/1976 | Fisher et al. |
| 4,142,411 A | * | 3/1979 | Deal ........................ 73/152.38 |
| 4,252,015 A | * | 2/1981 | Harbon et al. ............ 73/152.51 |
| 4,720,799 A | * | 1/1988 | Woithe et al. ................. 702/55 |
| 4,986,120 A | * | 1/1991 | Yanagisawa et al. ..... 73/152.41 |
| 5,418,466 A | * | 5/1995 | Watson et al. ............... 324/668 |
| 5,455,503 A | * | 10/1995 | Kohler ......................... 323/273 |
| 5,915,476 A | * | 6/1999 | Hubbell et al. .............. 166/113 |
| 6,274,865 B1 | * | 8/2001 | Schroer et al. ........... 250/269.1 |

OTHER PUBLICATIONS

Franklin Electric, Submersible Product Overview, http://www.fele.com/Prod_tex/item8.htm.
Endress + Hauser Technical Information TI 083R/24/ae Process Display RIA 261 Apr., 2001.
Endress + Hauser Technical Information TI 060R/24/ae Process Display RIA 250 Apr., 1999.
Endress + Hauser Technical Information TI 251P/24/ae Submersible Level Transmitter Waterpilot FMX 167 Apr., 2001.

* cited by examiner

*Primary Examiner*—Hezron Williams
*Assistant Examiner*—Rodney T. Frank
(74) *Attorney, Agent, or Firm*—Bose McKinney & Evans LLP

(57) ABSTRACT

An apparatus and method for monitoring a liquid level in a 4–20 mA closed loop system are provided. A process instrument and a measuring unit are powered for a predetermined time and power is provided by a battery.

14 Claims, 3 Drawing Sheets

WATER WELL MONITORING SYSTEM

FIELD OF THE INVENTION

The present invention relates generally to the measurement of water levels in wells, and, more particularly, to a self-powered 4–20 mA loop hydrostatic pressure based well monitoring apparatus and method.

BACKGROUND

In many regions of the U.S. and other countries, water resources are limited and privately owned wells are located in places without access to electrical power. Water conservation and preservation of water tables in these regions is important. Furthermore, monitoring of well contents and conditions for regulatory purposes, such as U.S. Geological Service programs and other programs, for example, is becoming increasingly important.

Currently, the water levels in many privately owned wells are not being monitored at all, and many that have been monitored have been monitored manually by the measuring tape or "stick" method. For instance, when a weighted, chalked string or steel tape is lowered into a well, the wetted chalk changes color. Provided that the weighted end of the string or tape is accurately lowered to the floor of the well, the color transition indicates the height of the water level after the string or tape is pulled back out of the well. In contrast, many wells on industrially owned properties and well-funded municipalities and utilities have been monitored by automated systems incorporating hydrostatic head pressure sensors that provide 4–20 mA signal outputs. Compared to these automated systems, the stick method is relatively inaccurate and labor intensive.

One solution for measuring the level of water in a well, U.S. Pat. No. 3,909,948 to Markfelt, is a servo or motorized electromechanical arrangement which measures the running length of cable let out by the servo system, and takes note of two specific positions during runout. The first position is when the sensing element (cable, tape or chain) contacts the top water surface, and the second being, effectively, the well bottom—indicated normally by the sensing element tip reaching the bottom of the well casing. The former position in the prior art system is detected by way of a simple conductivity change between two tip-mounted electrodes, but this detection provides no information besides a visual indication (light a bulb), at which point the user reads the markings on the cable. The latter position is detected by human-sensed line slack, and a similar marking reading.

A seemingly technologically-based system is a product called Pumptec, by Franklin Electric company (see www.franklinelectric.com). Pumtec uses a motor load (current) sensing technique to presumably monitor changing water levels. The product claims include a variety of indications to be inferred from the load, with changes in level being one of them. In fact, the load is so dependent on other factors (even some claiming to be monitored), such as line voltage levels, as to make it impractical as a level indication device. That is, if the pump load decreases due to line voltage drop, there is no way to determine if the "sensed" condition is a voltage drop or a level decrease.

Commercial wells are sometimes monitored by simple systems incorporating well-known hydrostatic head pressure sensors but are impractical for privately owned and remote wells due to expense, size, power requirements, and/or unnecessary and costly industrial control features. U.S. Pat. No. 4,142,411 to Deal discloses a temporarily installed hydrostatic sensor used to determine well draw down. Its purpose is to gather information related to the induced water level error caused by pump action (e.g. the difference between the true water level and localized level in the region of the pump). It may also be used to determine, for diagnostic purposes, the regeneration of the well level. It is not intended to be permanently installed, to provide continuous monitoring, nor is it capable of providing control outputs.

U.S. Pat. No. 3,975,115 to Fisher (assignee Hydrodyne Development Co.) discloses what is usually referred to in industry as a bubbler system, in which compressed air is forced into the water, with the pressure being increased slowly until it just is enough to force all the water out of a submerged tube, and is therefore equal to the hydrostatic pressure exerted by the water. A standard pressure sensing device, outside the well, then infers water level from that pressure reading.

4–20 mA based loops generally offer several advantages over voltage based signaling, such as easier detection of open circuits (from broken wires, for example) and short circuits (from crossed-wires, perhaps) and superior noise rejection characteristics. However, the expense, the complexities of setup, operation, and maintenance of typical 4–20 mA based hydrostatic systems have made them impractical for home owners and owners of wells on larger private properties such as ranches, feed lots, golf course, etc. Moreover, 4–20 mA systems have historically required external electrical power that is either not available or is cost prohibitive with respect to the cost of running electricity to the remote well locations encountered on many private properties.

The need exists for an economical easy-to-use water level monitoring system that will fit within a small pipe or well casings, can be used at remote locations where external power is not available and can provide the user with a display readout of the water level in the well.

SUMMARY OF THE INVENTION

The present invention provides an apparatus and method for monitoring a liquid level in a 4–20 mA closed loop system. An object is to provide an inexpensive, rugged hydrostatic sensing element which will fit down a small pipe or well casing, and provide the user with a display readout of the water level in the well. Hydrostatic sensing of well water level has existed before, but not packaged with battery operated power supply/display units, nor economically for the use by private well owners and at remote locations.

For privately owned wells in regions with limited resources, the practical, economical, easy-to-use water level monitoring system described here offers many beneficial and previously unavailable features to the user. It also offers benefits to society in general as information will promote water conservation, preserving needed water table resources. And finally, it will also provide government agencies with previously unavailable methods and devices for collection of regulatory and/or scientific information. Some of these benefits are:

1.) by frequent observation, the user may monitor general water consumption rates;
2.) by frequent observation, the user may predict well regeneration rates;
3.) the system will alert users to the need for water conservation efforts when low water levels are indicated;
4.) it can alert the user to dangerously low water conditions, or dry well, avoiding the risks of:
   a. permanently damaged pumps, which typically take 5–7 days to effect a repair or replacement and cost typically $800.00–$2000 to replace (at equal to or twice the cost of a monitoring system),
   b. the need to truck in, or otherwise purchase, water supplies for basic human, animal or industrial needs,
   c. the cost of a commercial operation's downtime, or loss of livestock, if without water, and
   d. lack of information needed by the public (e.g. local water authority can alert county to water table emergencies, or monitor consumption during drought conditions);
5.) monitoring of well contents in those regions where local water authorities are beginning to assess water rights issues and charges, under the presumption that wells pull from the supplying river just as surface-diverted water does, or from underground aquifers; and A battery-operated system according to the present invention also provides other attributes, and affords specific advantages:

1.) battery powered systems are more easily made portable; and
2.) even if permanently installed, battery powered systems eliminate the need for the expense or time of installing power cabling—of particular interest when the well is remote from the housing quarters or the monitoring office;

Features of the present invention which allow the use of a battery to power the system include:

1.) low power consumption, as is normally accomplished with "loop powered" devices,
2.) low supply voltage requirements, and
3.) devices to minimize battery depletion, such as a "sleep mode" in which the system is awakened upon demand to take a reading before falling back asleep.

Many of the advantages of a battery-powered system arise directly from the fact it need not be connected to the electrical power grid. Off-grid well monitoring systems:

1.) can be used even where pumps are windmill driven, and no power grid access is practical;
2.) can be used where the distance to the power grid is prohibitive; and
3.) can be used for hydrological surveys, by local, state or federal authorities to check water tables, wells or reservoirs, even at remote locations.

It is also envisioned that the well monitoring system can be provided with various electronic output signals, such as:

1.) discrete type (e.g. relay contacts) for alarms at specific low water points, or for direct control of pump shutdown;
2.) analog or digital type for sending information to a secondary, more distant remote indicator or control system; and
3.) wireless transmission of data by various telemetry means, such as wireless internet, satellite, or any other suitable means.

Such additional features are of primary interest to the operator of wells on a large property, but may find occasional use for residential users.

According to the present invention, the apparatus includes a process instrument, a power source configured to generate power, and a switching arrangement including an input coupled to the power source to receive power therefrom. The switching arrangement further includes an output, and the switching arrangement is configured to transmit power from the input to the output for a predetermined time. The system also includes a measuring unit coupled to the output of the switching arrangement to receive power therefrom. The measuring unit is configured to transmit power to the process instrument and to receive a 4–20 mA signal therefrom. The measuring includes an indicator that is configured to be powered by the 4–20 mA signal and that is further configured to indicate the liquid level based on the 4–20 mA signal.

A method of monitoring a liquid level includes providing operating power to a process instrument for a predetermined time period; transmitting a 4–20 mA signal from the process instrument to a measuring unit when the power is provided to the process instrument; powering an indicator in the measuring unit with the 4–20 mA signal when the power is provided to the process instrument; indicating the liquid level with the indicator based on the 4–20 mA signal; and suppressing the provision of power to the process instrument after the predetermined time period.

The above-noted features and advantages of the present invention, as well as additional features and advantages, will be readily apparent to those skilled in the art upon reference to the following detailed description and the accompanying drawings.

DETAILED DESCRIPTION OF EXEMPLARY EMBODIMENT

Figure 1:
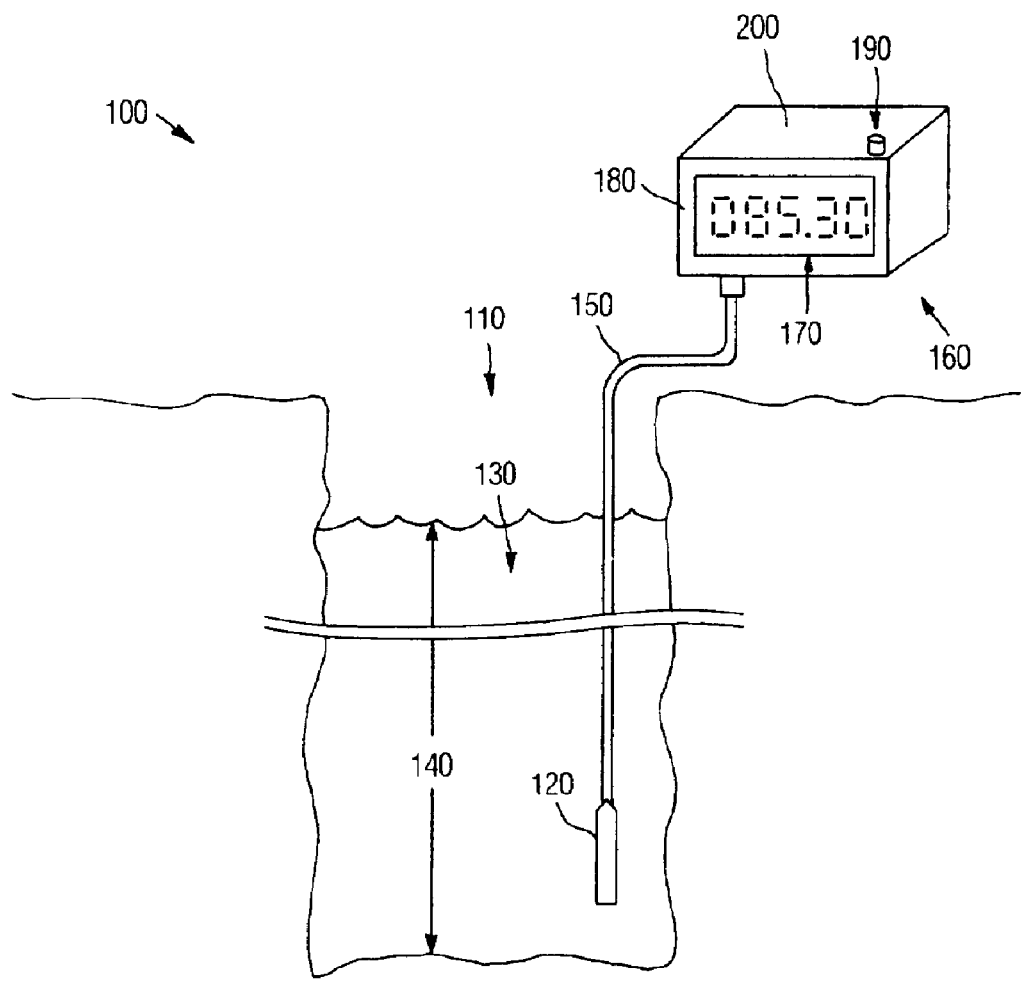
FIG. 1 is an illustration of an exemplary water well monitoring system according to the present invention (as installed in a well)

FIG. 1 is an illustration of an exemplary water well monitoring system 100 according to the present invention as installed in a typical operating environment such as, for example, a well 110. In general, a hydrostatic pressure sensor 120 measures a pressure exerted by a column of fluid (or "head pressure") and generates a signal corresponding to the pressure. Depending on the density of the fluid, among other things, the pressure signal is used to determine the height 140 of the column (i.e., the fluid level). To this end, the system 100 includes a 4–20 mA loop-powered hydrostatic pressure sensor 120, which is a model No. FMX 167 sensor available from Endress+Hauser, Inc. of Greenwood, Ind. Accordingly, Endress+Hauser, Inc.'s application notes TI 351 P/24/ae/04.01 © 2001 Endress+Hauser, Inc. for the FMX 167 are incorporated herein by reference. However, it is noted that other suitable hydrostatic pressure sensors may be used in alternative embodiments. Furthermore, it will be appreciated that the pressure sensor 120 is but one of a number of alternative process instruments that in alternative embodiments may provide a suitable low power, 4–20 mA output corresponding to a measured variable to the measuring unit 160 (which is discussed in further detail below).

In the exemplary system 100, the pressure sensor 120 is configured to be submerged in the well water 130. A cable 150 couples the pressure sensor 120 to a measuring unit 160 in a known manner. In general, the measuring unit 160 is configured to receive a 4–20 mA signal from the pressure sensor 120 and generate a corresponding human perceptible indication of the water level 140. Measuring unit 160 has an indicator 170 on a front face 180 and a standard, normally open push-button switch 190 on a surface 200 of the measuring unit 160. While the exemplary indicator 170 shown in FIG. 1 includes a liquid crystal display ("LCD"), it is noted that in alternative embodiments the indicator may include a light emitting diode ("LED") display, a paper printer, a sound generating device, or any other suitable device for providing an indication of the water level 140. Measuring unit 160 may be configured to provide various electronic output signals, such as discrete type (e.g.open collector) for alarms at specific low water points, and/or wireless transmission of data by various telemetry means, such as wireless internet, satellite, or any other suitable means. Measuring unit 160 is discussed in further detail below.

Figure 2:
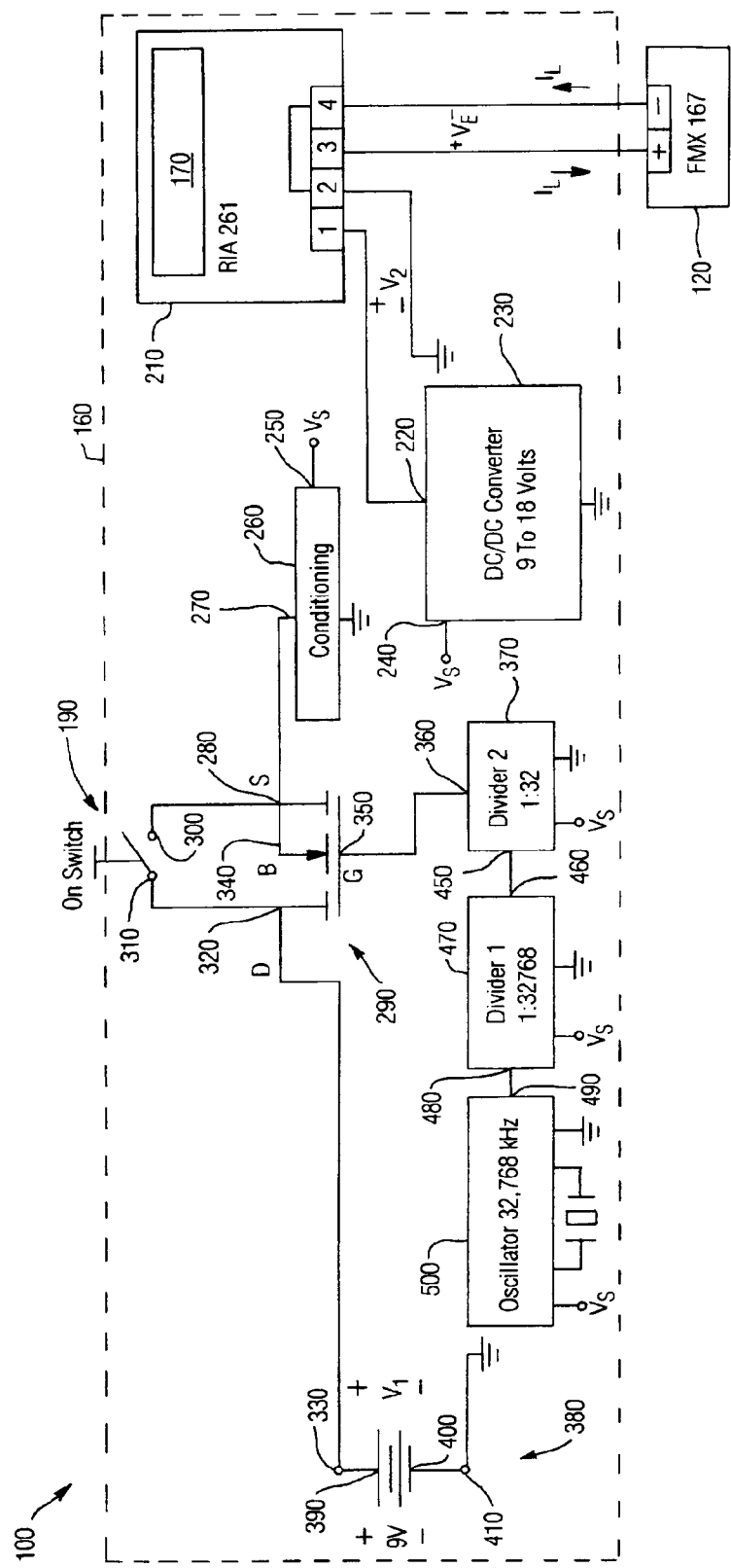
FIG. 2 is a block diagram of the system of FIG. 1.

FIG. 2 is a block diagram of the system 100 of FIG. 1. As shown, the pressure sensor 120 (discussed above) is coupled to the measuring unit 160 in a 4–20 mA type loop to receive power therefrom and to provide a 4–20 mA signal thereto (see $V_E$ and $I_L$). In the exemplary embodiment of FIG. 2, all of the components of the measuring unit 160 are enclosed within the same housing. It should be appreciated that this provides portability and ruggedness. Measuring unit 160 includes a processing unit 210, which includes the indicator 170 (discussed above). The processing unit 210 is configured to receive the 4–20 mA signal from the pressure sensor 120 and generate the appropriate corresponding signals for causing the indicator 170 to provide the corresponding human perceptible indication of the water level 140. Accordingly, the processing unit 210 is implemented with the standard hardware ("H/W") and software ("S/W") of the model No. RIA 261 process device available from Endress+ Hauser, Inc. of Greenwood, Ind. Endress+Hauser, Inc.'s application notes TI 083R/24/ae/04.01 © 2001 Endress+ Hauser, Inc. for the RIA 261 are incorporated herein by reference. As shown in FIG. 2, the positive or "+" terminal of the exemplary FMX 167 pressure sensor is coupled to terminal No. 3 of the exemplary RIA 261 H/W and the negative or "−" terminal of the FMX 167 sensor is coupled to terminal No. 4 of the exemplary RIA 261 H/W. It will be appreciated that in alternative embodiments, the processing unit 210 may be implemented with any other suitable hardware and/or software.

Terminal No. 2 of the exemplary RIA 261 is coupled to a voltage common in a manner that is well known. Terminal No. 1 of the RIA 261 is coupled to an output 220 of a DC—DC converter 230 to receive output power therefrom. In general, the DC—DC converter 230 is configured to receive input power at an input 240 and provide output power with a regulated voltage, $V_2$, at its output 220. The DC—DC converter 220 is a model No. MC2142 available from Micrel, or any other suitable regulator. It is noted, however, that in the embodiment of FIG. 2 the MC2142 has exhibited impressive regulation with input voltages as low as 6V. Input 240 is coupled to an output 250 of a conditioning arrangement 260.

In a manner that is well known, the conditioning arrangement 260 is configured to receive power at an input 270 and provide output power having a supply voltage, $V_S$. The conditioning arrangement 260 provides appropriate isolation and over-voltage protection. To this end, the conditioning arrangement 260 includes suitable blocking diodes, filter capacitors, and other well known components. Input 270 is coupled to the source 280 of a field-effect transistor ("FET") 290.

FET 290 is a model No. 2N7002 MOSFET available from Motorola, or any other suitable switching device. Source 280 of FET 290 is also coupled to the contact 300 of the push-button switch 190. The pole 310 of the push-button switch 190 is coupled to the drain 320 of the FET 290. Additionally, the drain 320 is coupled to a suitable commercially available battery connector 330. The substrate or base 340 of the FET 290 is coupled to the source 280. The gate 350 is coupled to an output 360 of a divider 370. The divider 370 is discussed in further detail below.

A DC battery 380 has a positive terminal 390 that is coupled to the battery connector 330. Further, the battery 380 has a negative terminal 400 that is coupled to a suitable commercially available battery connector 410, which is in turn coupled to the common in a well known manner. DC battery 380 is configured to provide a power having a voltage, $V_1$. In the exemplary embodiment, the battery 380 is configured to provide 9V. However, it is noted that a wide range of voltages may be suitable for alternative embodiments. Moreover, it is noted that alternative embodiments may include a rechargeable battery and/or solar powered devices in addition to or in place of the battery 380. The battery terminals 330 and 410 are configured to facilitate installation and removal of the battery 380 from the measuring unit 160 in a manner which is well known.

The divider 370 has an input 450 that is coupled to an output 460 of a divider 470. The divider 470 has an input 480 that coupled to an output 490 of an oscillator 500. The divider 370, the divider 470, and the oscillator 500 are all coupled to the output 250 of the conditioning arrangement 260 to receive operating power $V_S$ therefrom. The oscillator 500 is configured to provide a 32,768 kHz voltage signal at its output 490 in a manner that is well known. The divider 470 is configured in a well known manner to provide a voltage signal at its output 460 having a frequency 32,768 times lower than the frequency of the signal at its input 480. The divider 370 is configured to provide a voltage signal at its output 360 having a frequency 32 times lower than the frequency of the signal at its input 450. Thus, it should be appreciated that the oscillator 500, the dividers 470 and 370, the FET 290, and the switch 190 are configured to operate (as discussed in further detail below) as a switching arrangement wherein, in operation, a voltage at the output 360 of divider 370 (which is coupled to the gate 350 of the FET 290) changes state (or "cycles") about once every 32 seconds. The oscillator 500 and the divider 470 are implemented with corresponding portions of a model No. HEF 4060 integrated circuit (which provides an oscillator and a divider in the same package) available from Philip Semiconductor. The divider 360 is implemented with the appropriate portion of an additional HEF4060 integrated circuit. It should be appreciated, however, that in alternative embodiments any other suitable oscillator circuit(s), divider circuits, or other timing arrangements may be used.

In operation, closing the push-button switch 190 (see FIG. 2) creates a short (through the switch 190) between the drain 320 and the source 280 of the FET 290. This provides power from the battery 380 to the conditioning arrangement 260, which in turn distributes the power to the DC-to-DC converter 230, the divider 370, the divider 470, and the oscillator 500. The DC-to-DC converter then provides some of the power to the processing unit 210 (see $V_2$ on FIG. 2), which in turn provides operating (or "excitation") power to the pressure sensor 120.

Powering up the divider 370 causes it to generate a logical 1 or "high" voltage at its output 360, which is delivered to the gate 350 of the FET 290. This causes the FET 290 to "turn on" (i.e. to permit conduction between the drain 320 and the source 280 through the FET 290). Thus, the user may release the push-button and the power from the battery 380 will continue to be transmitted to the conditioning arrangement 260 through the operation of the FET 290, and thus, power to the various components (including the oscillator 500 and the dividers 370 and 470) will remain.

But after 32 sec, the divider 370 changes the voltage at its output 360 from a logical 1 to a logical 0 or "low" voltage. This effectively "turns off" the FET 290, which suppresses the delivery of the power from the battery 380 and consequently terminates all operations. Among other things, this automated shutoff feature ensures against undesired battery depletion that could otherwise result from a user neglecting to actively turn off a switch. Further, it should be noted that while the predetermined 32 sec operational time period is somewhat arbitrary, to the extent that the processing unit 210, the pressure sensor 120, or any other of the components of the system 100 require "boot up" or settling time upon power up, a suitable time period allows a practically hands free, one touch startup of the system 100. Also, it should be appreciated that when at rest, the system 100 consumes very little if any power. Additionally, it should be appreciated that operations may be resumed by again pressing the push-button switch 190. Also, it should be appreciated that a user may choose to maintain continuous closure of the push-button switch 190 (i.e., "hold the switch down" or "lean on the switch" without releasing it) when continuous operation in excess of 32 sec is desired.

Figure 3:
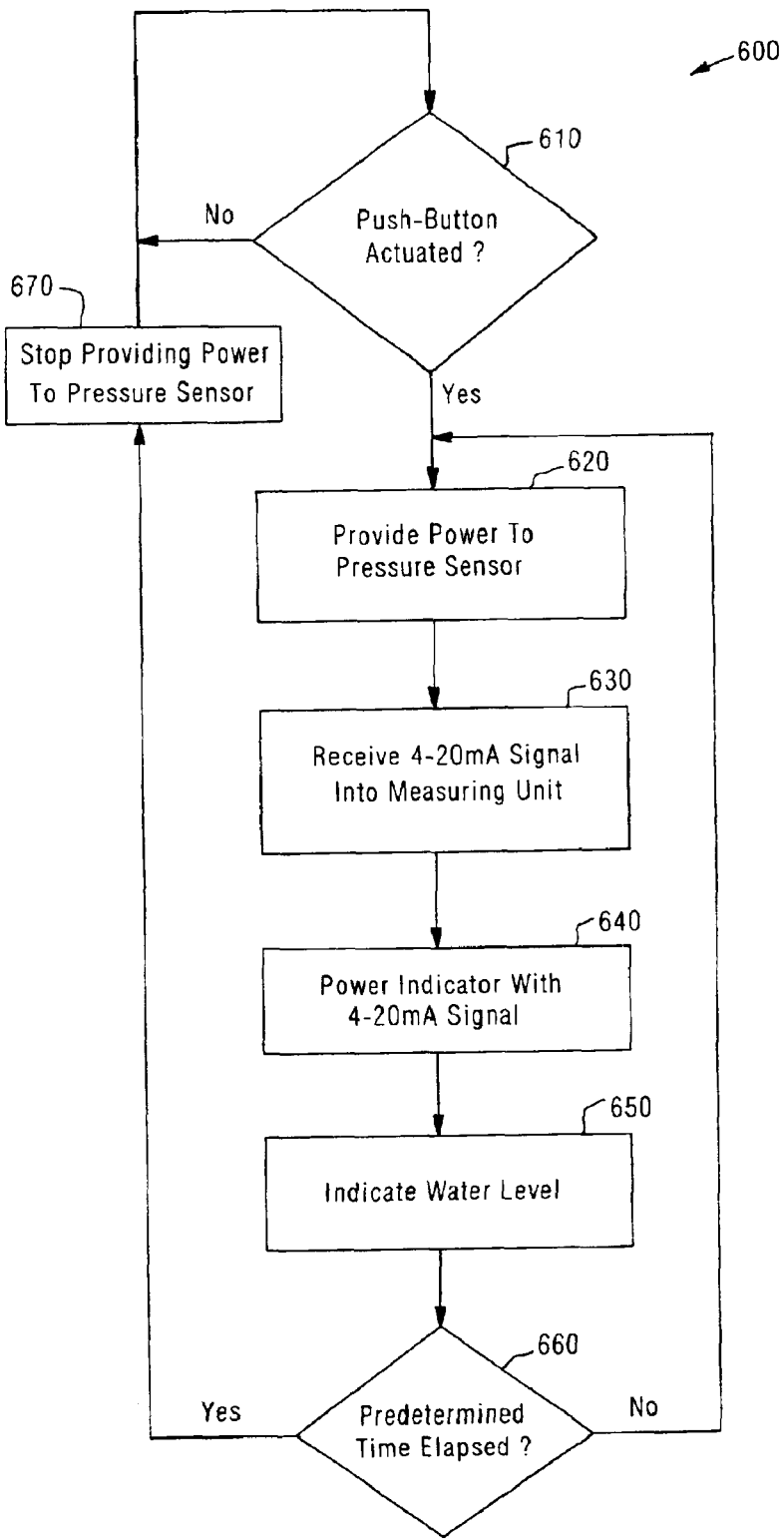
FIG. 3 is a flow diagram of an exemplary water well monitoring method for the system of FIG. 1 according to the present invention.

Next, FIG. 3 is a flow diagram of an exemplary water well monitoring method 600 for the system 100 of FIG. 1 according to the present invention. At step 610, the system 100 determines whether the push button 190 is actuated. It should be appreciated that although in the exemplary embodiment this determination is made manually by operation of the switch itself, alternative embodiments could read the switch state using processors or other arrangements. If the switch 190 is actuated, then at step 620 the system 100 provides power to the pressure sensor 120 and receives (step 630) the 4–20 mA signal from the pressure sensor 120 into the measuring unit 160. At step 640, the 4–20 mA signal powers the indicator 170. At step 650, the indicator 170 indicates the water level 140 (see FIG. 1). At step 660, the system 100 determines whether a predetermined time (32 sec in the exemplary embodiment) has elapsed; if so, then the system 100 stops providing power to the pressure sensor (step 670); otherwise, then the system 100 continues operations (repeats steps 620–660.)

The foregoing description of the invention is illustrative only, and is not intended to limit the scope of the invention to the precise terms set forth. Further, although the invention has been described in detail with reference to certain illustrative embodiments, variations and modifications exist within the scope and spirit of the invention as described and defined in the following claims.

What is claimed is:

1. An apparatus for monitoring a liquid level in a 4–20 mA closed loop system, comprising:
   a process instrument;
   a power source configured to generate power;
   a switching arrangement including an input coupled to the power source to receive power therefrom, the switching arrangement further including an output, the switching arrangement being configured to transmit power from the input to the output for a predetermined time; the switching arrangement further including a timing arrangement, the switching arrangement being configured to use the timing arrangement for controlling the predetermined time; and
   a measuring unit coupled to the output of the switching arrangement to receive power therefrom, the measuring unit being configured to transmit power to the process instrument and to receive a 4–20 mA signal therefrom, the measuring unit including an indicator being configured to be powered by the 4–20 mA signal and being further configured to indicate the liquid level based on the 4–20 mA signal.

2. The apparatus of claim 1, wherein the process instrument includes a pressure sensor.

3. The apparatus of claim 2, wherein the power source includes a battery.

4. The apparatus of claim 3, wherein the power source includes a 9 Volt battery.

5. The apparatus of claim 4, further comprising:
   a DC-to-DC converter including an input coupled to the output of the switching arrangement, the DC-to-DC converter further including an output coupled to the input of the measuring unit, the DC-to-DC converter being configured to receive 9 Volts at its input and to provide 18 Volts at its output;

6. The apparatus of claim 5, wherein the timing arrangement includes an oscillator.

7. The apparatus of claim 6, wherein the input of the DC-to-DC converter is coupled to the output of the switching arrangement through a conditioning arrangement.

8. The apparatus of claim 7, wherein the indicator includes at least one of an LED and an LCD.

9. An apparatus for monitoring a liquid level in a 4–20 mA closed loop system, comprising:

a process instrument;

a power source configured to generate power;

a switching arrangement including an input coupled to the power source to receive power therefrom, the switching arrangement further including an output, the switching arrangement being configured to transmit power from the input to the output for a predetermined time;

a measuring unit coupled to the output of the switching arrangement to receive power therefrom, the measuring unit being configured to transmit power to the process instrument and to receive a 4–20 mA signal therefrom, the measuring unit including an indicator being configured to be powered by the 4–20 mA signal and being further configured to indicate the liquid level based on the 4–20 mA signal; and a DC-to-DC converter; wherein the output of the switching arrangement is coupled to the measuring unit through the DC-to-DC converter.

10. The apparatus of claim 9, wherein the DC-to-DC converter is configured to receive a first DC voltage and to provide a second DC voltage that is substantially higher than the first voltage.

11. The apparatus of claim 1, wherein the timing arrangement includes an oscillator.

12. A method for monitoring a liquid level in a 4–20 mA closed loop system, comprising the steps of:

providing operating power to a process instrument for a predetermined time period;

transmitting a 4–20 mA signal from the process instrument to a measuring unit when the power is provided to the process instrument;

powering an indicator in the measuring unit with the 4–20 mA signal when the power is provided to the process instrument;

indicating the liquid level with the indicator based on the 4–20 mA signal;

suppressing the provision of power to the process instrument after the predetermined time period; and controlling the predetermined time period with a timing arrangement.

13. The method of claim 12, wherein the step of providing the operating power to the process instrument includes providing the operating power to a pressure sensor.

14. The method of claim 13, wherein the step of providing the operating power to the process instrument includes providing at least a portion of the operating power from a battery.

\* \* \* \* \*